United States Patent
Yamada et al.

(10) Patent No.: US 10,411,554 B2
(45) Date of Patent: Sep. 10, 2019

(54) MOTOR WITH WIRING BOARD FORMED BY CONNECTING WINDING UNDER PRESSURE

(71) Applicant: FANUC CORPORATION, Yamanashi (JP)

(72) Inventors: Koutarou Yamada, Yamanashi (JP); Takeshi Tamaki, Yamanashi (JP); Kouji Kobayashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 232 days.

(21) Appl. No.: 15/483,217

(22) Filed: Apr. 10, 2017

(65) Prior Publication Data
US 2017/0302129 A1    Oct. 19, 2017

(30) Foreign Application Priority Data

Apr. 15, 2016 (JP) ................... 2016-082098

(51) Int. Cl.
*H02K 5/22* (2006.01)
*H02K 3/28* (2006.01)
*H02K 3/52* (2006.01)

(52) U.S. Cl.
CPC ............. *H02K 5/225* (2013.01); *H02K 3/28* (2013.01); *H02K 3/522* (2013.01); *H02K 2203/03* (2013.01)

(58) Field of Classification Search
CPC ...... H02K 3/28; H02K 5/225; H02K 2203/03; H02K 3/522
USPC .......................................... 310/71
See application file for complete search history.

(56) References Cited

U.S. PATENT DOCUMENTS

| | | | |
|---|---|---|---|
| 5,054,329 A | * | 10/1991 | Morishita ............... F02N 15/00 277/577 |
| 2007/0205678 A1 | * | 9/2007 | Takashima ............. H02K 3/522 310/71 |
| 2007/0232094 A1 | * | 10/2007 | Hoshika ................. H02K 3/522 439/76.2 |

(Continued)

FOREIGN PATENT DOCUMENTS

| CN | 203193421 U | 9/2013 |
|---|---|---|
| CN | 103986266 A | 8/2014 |

(Continued)

OTHER PUBLICATIONS

Translation of foreign document JP 2007267535 (Year: 2007).*

(Continued)

*Primary Examiner* — Alex W Mok
(74) *Attorney, Agent, or Firm* — Studebaker & Brackett PC

(57) ABSTRACT

To provide a motor with a wiring board achieving simplification of work and suitable for automation of the work. A motor provided herein includes a wiring board attached to a stator with multiple wound coils. The wiring board comprises: a wiring settlement member where ends of the multiple coils are housed in their settled positions; and a circuit board with multiple terminals provided at positions corresponding to positions of the wiring settlement member where the coils are housed. The ends of the coils are connected under pressure to the terminals to form connections between the coils and the terminals by attaching the circuit board to the wiring settlement member.

3 Claims, 6 Drawing Sheets

(56) References Cited

U.S. PATENT DOCUMENTS

| | | | | |
|---|---|---|---|---|
| 2009/0256439 | A1* | 10/2009 | Inoue | H02K 3/522 310/71 |
| 2011/0080062 | A1* | 4/2011 | Noh | H02K 3/522 310/71 |
| 2012/0293024 | A1* | 11/2012 | Yokogawa | H02K 1/278 310/43 |
| 2014/0154933 | A1 | 6/2014 | Miura et al. | |

FOREIGN PATENT DOCUMENTS

| | | |
|---|---|---|
| JP | H11-289702 A | 10/1999 |
| JP | 2003-088077 A | 3/2003 |
| JP | 2007-267535 A | 10/2007 |
| JP | 4709048 B2 | 6/2011 |
| JP | 2014-110673 A | 6/2014 |
| JP | 2014-155316 A | 8/2014 |

OTHER PUBLICATIONS

Translation of foreign document JP 2014110673 (Year: 2014).*
Translation of foreign document JP 2014155316 (Year: 2014).*
An Office Action; "Decision to Grant a Patent"; mailed by the Japanese Patent Office dated Nov. 6, 2018, which corresponds to Japanese Patent Application No. 2016-082098 and is related to U.S. Appl. No. 15/483,217; with English language translation.
An Office Action; "Notification of Reasons for Refusal," mailed by the Japanese Patent Office dated May 15, 2018, which corresponds to Japanese Patent Application No. 2016-082098 and is related to U.S. Appl. No. 15/483,217; with English language translation.
An Office Action mailed by the Chinese Patent Office dated Feb. 15, 2019, which corresponds to Chinese Patent Application No. 201710239161.X and is related to U.S. Appl. No. 15/483,217.

* cited by examiner

MOTOR WITH WIRING BOARD FORMED BY CONNECTING WINDING UNDER PRESSURE

This application is based on and claims the benefit of priority from Japanese Patent Application No. 2016-082098, filed on 15 Apr. 2016, the content of which is incorporated herein by reference.

BACKGROUND OF THE INVENTION

Field of the Invention

The present invention relates to a motor with a wiring board.

Related Art

According to a technique conventionally known about a motor, a stator-side winding and a circuit board are connected using a wiring board.

For example, patent document 1 discloses a configuration where a circuit board and a winding are connected by connecting a terminal formed at the circuit board under pressure to a terminal electrically continuous with the winding. Patent document 2 discloses a wire connection configuration where a stator core is electrically connected to an earth pin by joining a board body including a power line connector integrally provided to the board body and the stator core with a bolt.

Patent Document 1: Japanese Unexamined Patent Application, Publication No. 2003-88077
Patent Document 2: Japanese Unexamined Patent Application, Publication No. H11-289702

SUMMARY OF THE INVENTION

However, connecting the circuit board and an end of the winding pulled out of a stator takes time as this connecting work is done by soldering. Soldering is complicated work and cannot easily be done automatically. For this reason, the conventional work of connecting the stator-side winding and the terminal of the circuit board has room for improvement in terms of simplification and automation of the work.

The present invention has been made in view of the aforementioned problem. It is an object of the present invention to provide a motor with a wiring board achieving simplification of work and suitable for automation of the work.

(1) In a motor (a motor 100 described later, for example) with a wiring board (a wiring board 5 described later, for example) according to the present invention, the wiring board is attached to a stator (a stator 1 described later, for example) with multiple wound windings (coils 4 described later, for example). The wiring board comprises: a wiring settlement member (a wiring settlement member 7 described later, for example) where ends (ends 41 described later, for example) of the multiple windings are housed in their settled positions; and a circuit board (a circuit board 8 described later, for example) with multiple terminals (terminals 81 described later, for example) provided at positions corresponding to positions of the wiring settlement member where the windings are housed. The ends of the windings are connected under pressure to the terminals to form connections between the windings and the terminals by attaching the circuit board to the wiring settlement member.

(2) In the invention described in (1), the wiring settlement member may include multiple grooves (grooves 71 described later, for example) extending in a radial pattern, and the multiple windings may be settled in their positions by arranging the ends of the windings inside the grooves.

(3) In the invention described in (2), the wiring settlement member may include recessed terminal housing parts (terminal housing parts 73 described later, for example) communicating with the grooves and formed to allow the terminals to be housed in the terminal housing parts.

(4) In the invention described in (1), (2), and (3), the wiring board may include a connector (a power line connector 6 described later, for example) electrically connected to the multiple terminals.

The present invention is capable of providing a motor with a wiring board achieving simplification of work and suitable for automation of the work.

DETAILED DESCRIPTION OF THE INVENTION

Figure 1:
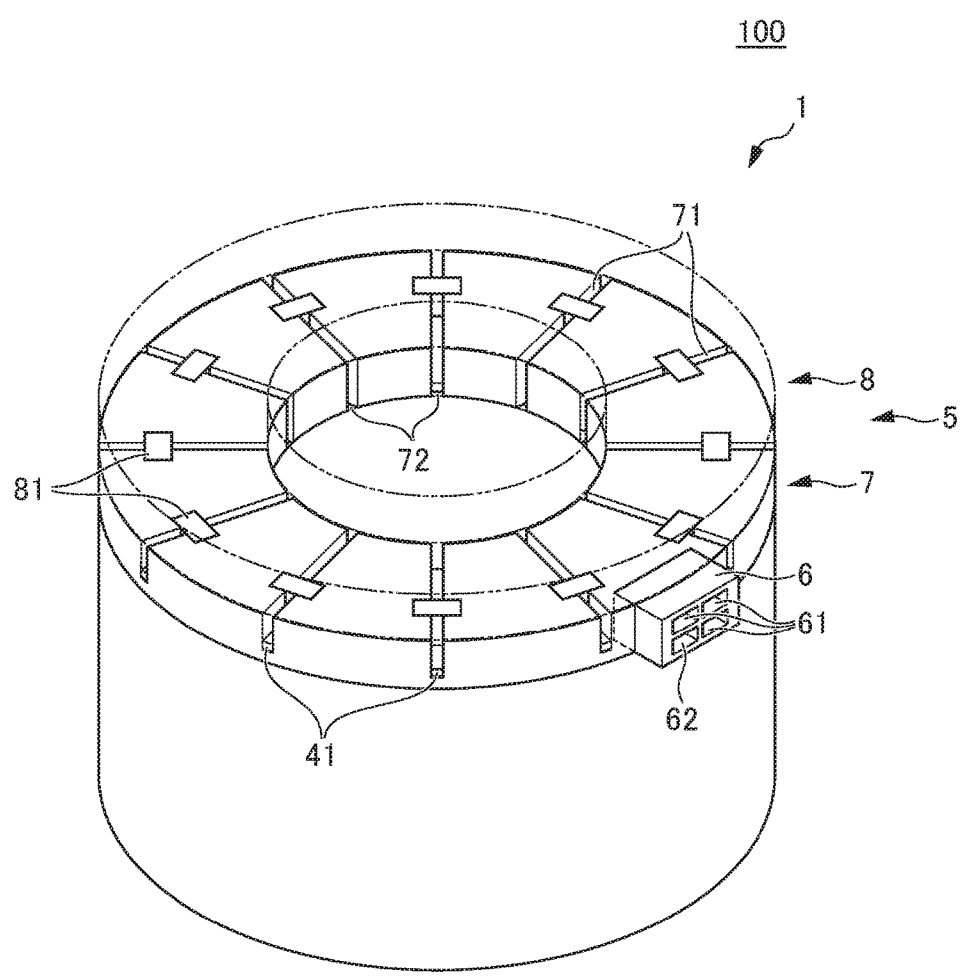
FIG. 1 is a perspective view showing a stator with a wiring board according to an embodiment of the present invention.

An embodiment of the present invention will be described below in detail by referring to the drawings. In the description given below, a direction in which a wiring board is installed on a stator core will be called a vertical direction.

Figure 2:
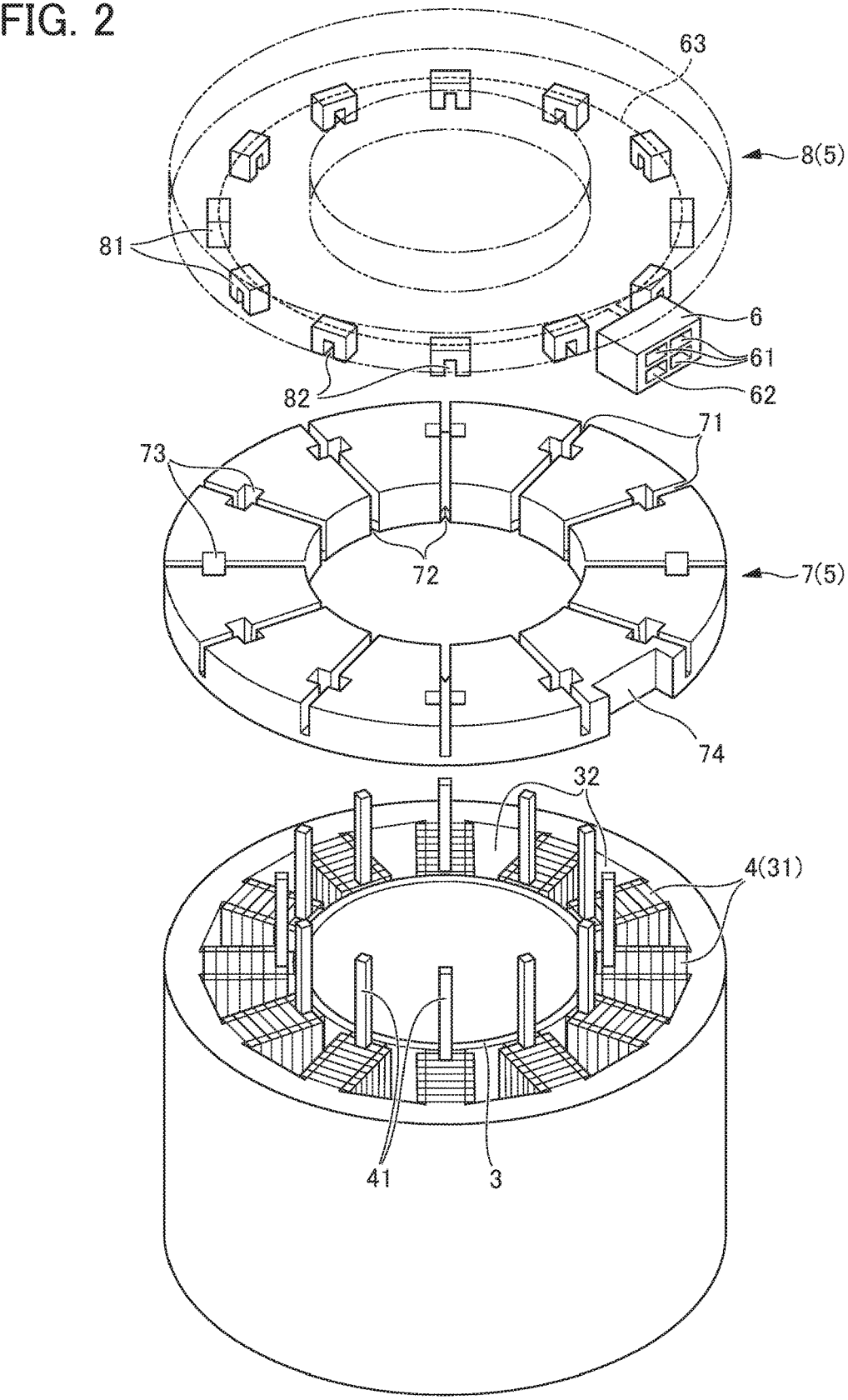
FIG. 2 is an exploded perspective view of the stator according to this embodiment.

FIG. 1 is a perspective view showing a stator 1 with a wiring board 5 according to this embodiment of the present invention. FIG. 2 is an exploded perspective view of the stator 1 according to this embodiment.

The stator 1 shown in FIGS. 1 and 2 is to become a component of a motor 100.

The stator 1 according to this embodiment includes a stator core 3, a coil (winding) 4, a wiring board 5, and a power line connector (connector) 6.

The stator core 3 is formed by laminating multiple steel plates each having a circular hole at the center of the motor 100. The stator core 3 according to this embodiment includes multiple teeth parts 31 provided around the hole and projecting radially outwardly. The multiple teeth parts 31 are spaced uniformly in a peripheral direction. A slot 32 extending continuously in the vertical direction is formed between adjacent ones of the teeth parts 31. A coil 4 is formed at each tooth part 31 of the stator core 3.

A rotor not shown in the drawings is rotatably arranged inside the circular hole of the stator core 3. The wiring board 5 and the power line connector 6 are arranged over the stator core 3. The rotator is rotated by supply of power from the power line connector 6 to the coil 4.

The coil 4 is formed of a conductive wire passed through the slot 32 of the stator core 3 and wound around each tooth part 31 a given number of turns. An end 41 belonging to one side of the coil 4 is arranged to extend upwardly from the stator core 3. An end belonging to an opposite side of the coil 4 (not shown in the drawings) is connected to an end belonging to an opposite side of one of different coils 4 provided below the stator core 3 and spaced at given intervals along the circumference of a circle. In this way, electrical continuity is formed between predetermined ones of multiple coils 4. The other part of the wound coil 4 except the end 41 is covered with an insulator.

The wiring board 5 is arranged on the stator core 3 in such a manner that the end 41 of the coil 4 is fitted in a part of the wiring board 5. The wiring board 5 is connected so as to settle each end 41 and to supply power to each end 41.

The wiring board 5 according to this embodiment includes a wiring settlement member 7 and a circuit board 8. The power line connector 6 is attached to the outer periphery of the wiring board 5.

The wiring settlement member 7 is formed into a ring-like shape with a circular through hole formed at the center of the wiring settlement member 7. The wiring settlement member 7 is provided with multiple grooves 71 spaced uniformly in the upper surface of an outer peripheral area around the through hole of the wiring settlement member 7. The grooves 71 each have a given thickness in the vertical direction and extend in a radial pattern.

The wiring settlement member 7 has a cutout 72 formed at an inner peripheral side of the groove 71 and allowing a root of the end 41 to be fitted in the cutout 72. The wiring settlement member 7 has a terminal housing part 73 formed at an outer peripheral side of the groove 71 and allowing a terminal 81 of the circuit board 8 described later to be housed in the terminal housing part 73.

The outer periphery of the wiring settlement member 7 is provided with a connector installation part 74 allowing a part of the power line connector 6 to be fitted in the connector installation part 74.

The wiring settlement member 7 is arranged on the stator core 3 in such a manner that the root of the end 41 of the coil 4 extending upwardly is fitted in the cutout 72 of the wiring settlement member 7. The end 41 of the coil 4 is housed inside the groove 71 of the wiring settlement member 7, thereby settling the ends 41 in a radial pattern. The terminal 81 of the circuit board 8 is housed inside the terminal housing part 73 of the wiring settlement member 7, thereby connecting the end 41 communicating with the groove 71 and the terminal 81.

The circuit board 8 is arranged over the wiring settlement member 7. The circuit board 8 is formed into ring-like shape with a circular through hole formed at the center of the circuit board 8. The circuit board 8 has a lower surface provided with terminals 81 spaced uniformly in a circumferential direction. The number of the terminals 81 corresponds to that of the ends 41.

The terminal 81 of the circuit board 8 is housed in the terminal housing part 73, thereby electrically connecting the terminal 81 and the end 41. A conductive wire 63 extending from the power line connector 6 described later is connected to the terminal 81 of the circuit board 8, thereby supplying power to the coil 4 through the terminal 81.

The terminal 81 has a lower surface provided with a fitting recess 82 that allows the end 41 housed in the groove 71 of the wiring settlement member 7 to be fitted in the fitting recess 82. Fitting the end 41 of the coil 4 in the fitting recess 82 ensures a connection between the terminal 81 of the circuit board 8 and the end 41 of the coil 4.

The power line connector (connector) 6 is provided on the lower surface of the circuit board 8 in a manner that allows the power line connector 6 to be fitted in the wiring settlement member 7. The power line connector 6 according to this embodiment has an outer side surface with three input parts 61 for connections to power lines and an earth part 62 for a connection to the earth. The power line connector 6 has an inner side surface with the conductive wire 63. The conductive wire 63 is electrically connected to a corresponding terminal 81. Power lines through which alternating currents are supplied from a three-phase power supply AC unit are connected to corresponding ones of the three input parts 61.

The following explains a method of manufacturing the stator 1 having each of the above-described configurations by referring to FIGS. 3 to 6. FIGS. 3 to 6 explain operation of installing the wiring board 5 according to this embodiment.

Figure 3:
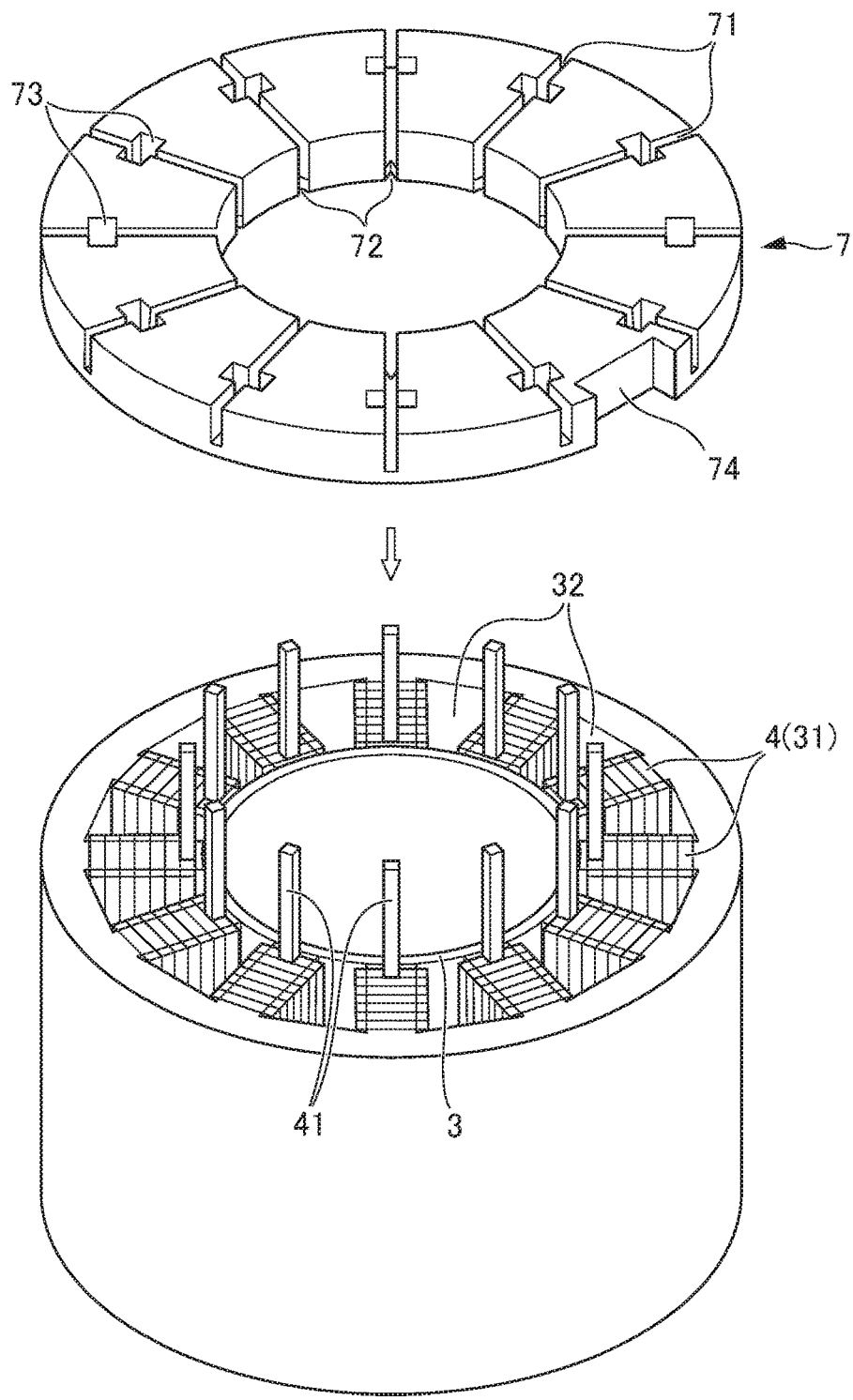
FIG. 3 explains operation of installing the wiring board according to this embodiment.
Figure 4:
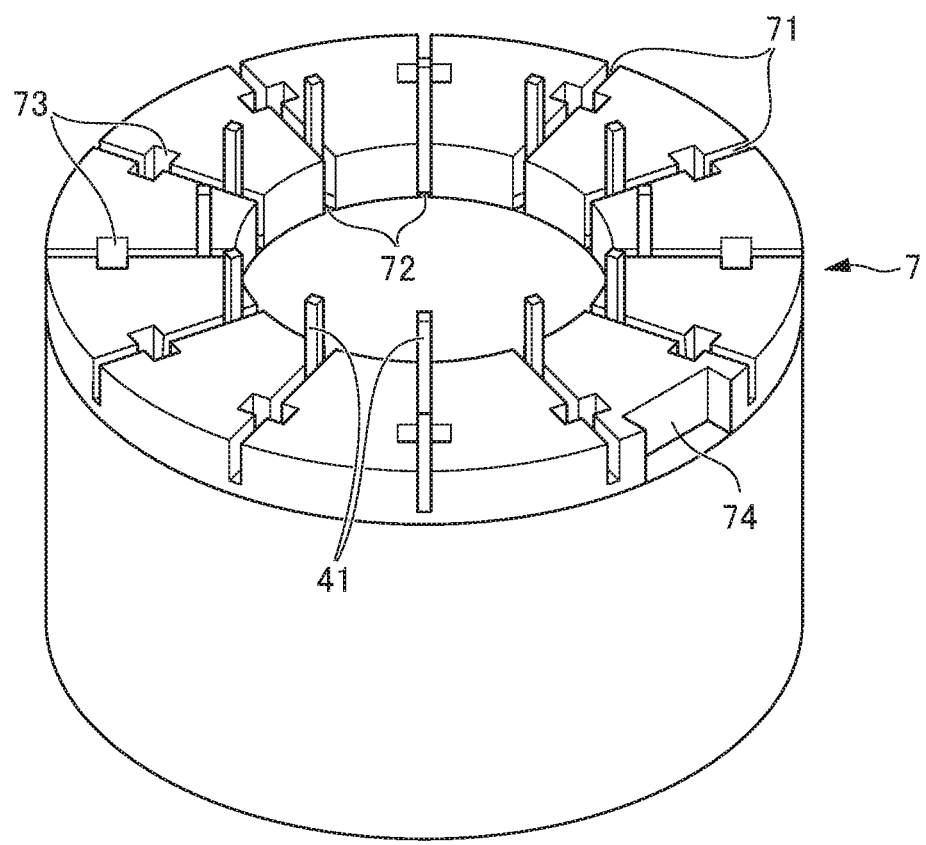
FIG. 4 explains the operation of installing the wiring board according to this embodiment.

First, as shown in FIG. 3, the coil 4 is wound around the tooth part 31 and the wiring settlement member 7 is attached to the stator core 3 from above while the end 41 is pointed upwardly in the stator core 3. By attaching the wiring settlement member 7 to the stator core 3, the root of the end 41 is fitted in the cutout 72 of the wiring settlement member 7.

Figure 5:
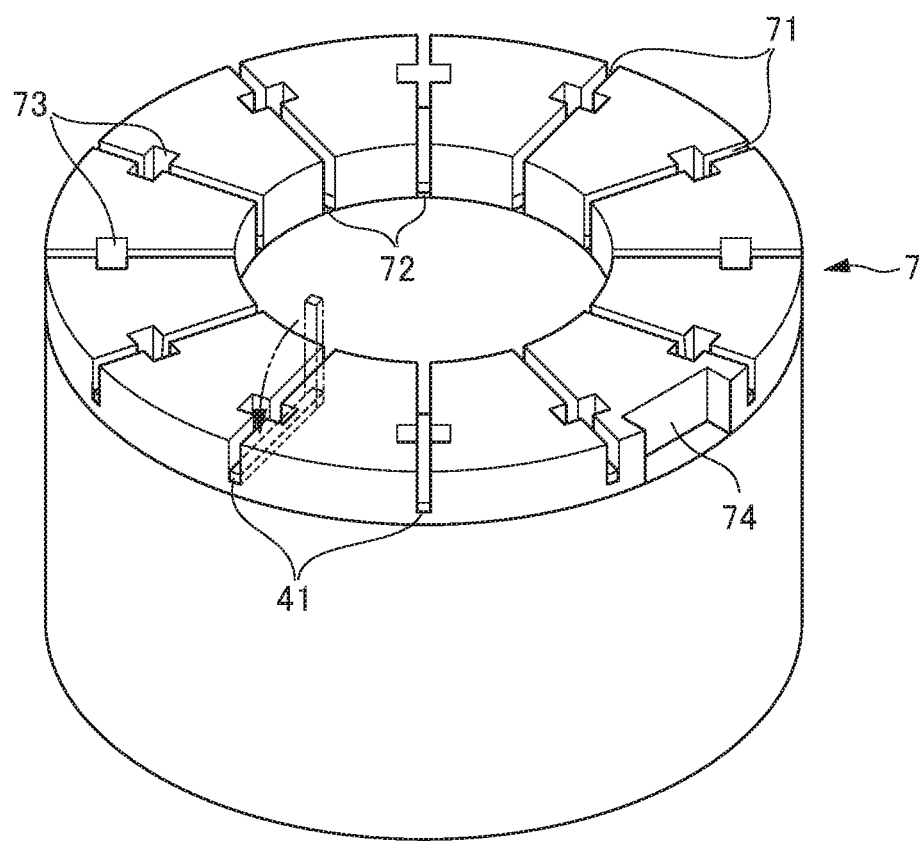
FIG. 5 explains the operation of installing the wiring board according to this embodiment.

Next, as shown in FIG. 5, the end 41 of each coil 4 is bent from the cutout 72 toward an outer peripheral side. By doing so, each end 41 is housed inside the groove 71 of the wiring settlement member 7. In this way, the ends 41 are settled in a radial pattern.

Figure 6:
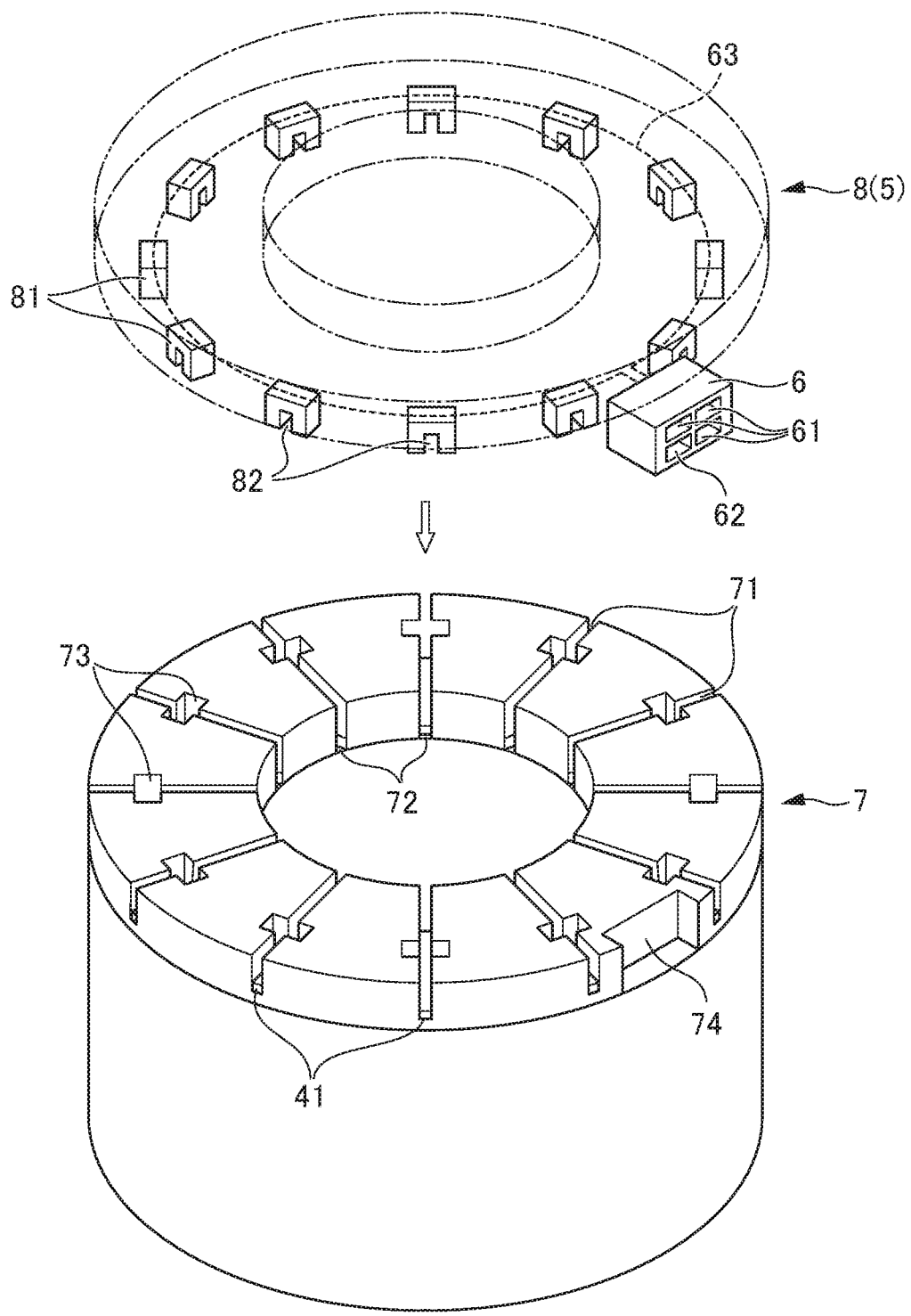
FIG. 6 explains the operation of installing the wiring board according to this embodiment.

Next, as shown in FIG. 6, the circuit board 8 is installed on the wiring settlement member 7 from above so as to fit the power line connector 6 in the connector installation part 74 of the wiring settlement member 7. By doing so, the terminal 81 under the circuit board 8 is housed in the corresponding terminal housing part 73 and the fitting recess 82 of the terminal 81 is connected under pressure to the corresponding end 41. This connection under pressure forms a connection between the terminal 81 and the coil 4. Wiring proceeds with the above-described attachment of the wiring board 5 to the coil 4 of the stator core 3.

Then, the rotor not shown in the drawings is rotatably arranged inside the stator 1 to manufacture the motor 100.

This embodiment achieves the following effects.

(1) The configuration of the motor 100 with the wiring board 5 according to this embodiment includes the wiring settlement member 7 where the ends 41 of the multiple coils 4 are housed in their settled positions, and the circuit board 8 with the multiple terminals 81 provided at positions corresponding to positions of the wiring settlement member 7 where the coils 4 are housed. By attaching the circuit board 8 to the wiring settlement member 7, the ends 41 of the coils 4 are connected under pressure to the terminals 81 to form connections between the coils 4 and the terminals 81.

Regarding the wiring board 5 described above, the end 41 of each coil 4 is first housed in the groove 71 of the wiring settlement member 7. Then, each terminal 81 is housed in the corresponding terminal housing part 73 to connect the multiple terminals 81 under pressure to the ends 41. More specifically, the fitting recesses 82 of the terminals 81 are connected to the ends 41.

Regarding the motor 100 with the wiring board 5 according to this embodiment, wiring of the coil 4 is done by installation of the wiring settlement member 7 on the stator core 3 from above, housing of the end 41 in the groove 71, and installation of the circuit board 8 on the wiring settlement member 7 with the housed end 41. As a result, the multiple coils 4 can collectively be connected to the terminals 81 of the circuit board 8 without requiring laborious soldering having conventionally been done. This achieves simplification of wiring work and shortening of time of the work effectively. Further, unlike the conventional configuration, the configuration according to this embodiment can omit removal of a covering, so that the wiring work can be done more preferably. Thus, the motor 100 with the wiring board 5 provided herein can be suitable for automation.

(2) In the motor 100 with the wiring board 5 described in (1), the wiring settlement member 7 includes the multiple grooves 71 extending in a radial pattern. The multiple coils 4 are settled in their positions by arranging the ends 41 of the coils 4 inside the grooves 71.

Regarding the motor 100 with the wiring board 5 described in (2), particularly in the wiring board 5 described in (1), the grooves 71 extend in a radial pattern. This acts to prevent contact between the ends 41, so that a short between the ends 41 can be prevented. This eliminates the need for process of electrically insulating the ends 41, etc., making it possible to reduce the number of works relating to wiring process. Thus, the wiring process is simplified, so that the motor 100 with the wiring board 5 provided herein can be more suitable for automation.

(3) In the motor 100 with the wiring board 5 described in (2), the wiring settlement member 7 includes the recessed terminal housing parts 73 communicating with the grooves 71 and formed to allow the terminals 81 to be housed in the terminal housing parts 73.

Regarding the motor 100 with the wiring board 5 described in (3), particularly in the wiring board 5 described in (2), the multiple terminals 81 are connected to the corresponding ends 41 of the coils 4 in the terminal housing parts 73. Thus, the ends 41 of the multiple coils 4 and the terminals 81 of the circuit board 8 can reliably be connected by forming connections under pressure at one time. This makes it possible to shorten time required for aligning the ends 41 of the coils 4 and the terminals 81 with each other, so that time of the work an be shortened further.

(4) In the motor 100 with the wiring board 5 described in (1), (2), and (3), the wiring board 5 includes the power line connector 6 electrically connected to the multiple terminals 81.

Regarding the motor 100 with the wiring board 5 described in (4), particularly in the wiring board 5 described in (1), (2), and (3), the power line connector 6 is connected in advance to the multiple terminals 81. This does not require manual operation for connecting the power line connector 6. Thus, the wiring process is simplified, so that the motor 100 with the wiring board 5 provided herein can be more suitable for automation.

The present invention is not limited to each embodiment described above but modifications, improvements, etc. can be covered by the present invention as long as such modifications, improvements, etc. are in a range that achieves the purpose of the present invention.

For example, the end 41 of the coil 4 extending upwardly from the stator core 3 is arranged on an inner peripheral side of the stator core 3. Alternatively, the end 41 may be arranged on an outer peripheral side of the stator core 3. If the end 41 of the coil 4 is arranged on the outer peripheral side, the end 41 of the coil 4 can be housed in the groove 71 of the wiring settlement member 7 by being bent from the outer peripheral side of the stator core 3 in a radial direction toward the inner peripheral side thereof in the radial direction.

EXPLANATION OF REFERENCE NUMERALS

1 Stator
3 Stator core
31 Tooth part
4 Coil (winding)
41 End
5 Wiring board
6 Power line connector (connector)
7 Wiring settlement member
71 Groove
73 Terminal housing part
8 Circuit board
81 Terminal
100 Motor

What is claimed is:

1. A motor with a wiring board attached to a stator with multiple wound windings, the wiring board comprising:
 a wiring settlement member where ends of the multiple windings are housed in their settled positions, the wiring settlement member being axially positioned above the multiple windings and covering a radial width of each winding; and
 a circuit board with multiple terminals at positions corresponding to positions of the wiring settlement member where the windings are housed, wherein
 the wiring settlement member includes:
  multiple grooves extending from an inner peripheral surface of the wiring settlement member to an outer peripheral surface of the wiring settlement member in a radial pattern; and
  recessed terminal housing parts communicating with the grooves and formed to allow the terminals to be housed in the terminal housing parts, each of the terminal housing parts being positioned in between the inner peripheral surface and the outer peripheral surface of the wiring settlement member, and formed above each winding of the stator in the axial direction, wherein
 the grooves have a predetermined thickness in a direction in which the circuit board is arranged in relation to a stator core, and the multiple windings are settled in their positions by arranging ends of the windings inside the grooves, and wherein
 attaching the circuit board having the multiple terminals at positions corresponding to positions of the wiring settlement member where the windings are housed to the wiring settlement member in a direction in which the circuit board is arranged causes the positioned terminals to be connected under pressure to respective ends of the windings.

2. The motor with the wiring board according to claim 1, wherein
 the terminals are arranged on the circuit board in a circumferential direction.

3. The motor with the wiring board according to claim 1, wherein
 the wiring board includes a connector electrically connected to the multiple terminals.

* * * * *